(12) United States Patent
Presley et al.

(10) Patent No.: US 9,090,466 B2
(45) Date of Patent: Jul. 28, 2015

(54) OXYGEN STORAGE AND GENERATION USING AN OXYGEN GENERATING LIQUID

(75) Inventors: Kenneth Lee Presley, Louisville, CO (US); Scott Clarence Meyers, Fountain Hills, AZ (US)

(73) Assignee: API Engineering, LLC, Lafayette, CO (US)

( * ) Notice: Subject to any disclaimer, the term of this patent is extended or adjusted under 35 U.S.C. 154(b) by 456 days.

(21) Appl. No.: 13/495,673

(22) Filed: Jun. 13, 2012

(65) Prior Publication Data

US 2012/0308475 A1    Dec. 6, 2012

Related U.S. Application Data

(63) Continuation-in-part of application No. 12/927,545, filed on Nov. 17, 2010, now abandoned.

(60) Provisional application No. 61/281,406, filed on Nov. 17, 2009.

(51) Int. Cl.
   *C01B 13/02* (2006.01)
   *A62B 21/00* (2006.01)

(52) U.S. Cl.
   CPC ............. *C01B 13/0218* (2013.01); *A62B 21/00* (2013.01)

(58) Field of Classification Search
   CPC ........................... C01B 13/0218; A62B 21/00
   USPC ..................... 423/579, 475; 422/120
   See application file for complete search history.

(56) References Cited

U.S. PATENT DOCUMENTS

| 3,316,728 | A  |   | 5/1967  | Biermann |
|-----------|----|---|---------|----------|
| 3,615,251 | A  |   | 10/1971 | Klenk |
| 4,981,655 | A  |   | 1/1991  | Kolbe |
| 5,376,352 | A  | * | 12/1994 | Peters et al. .................. 423/579 |
| 6,165,295 | A  |   | 12/2000 | Wagaman |
| 6,230,491 | B1 |   | 5/2001  | Wagaman |
| 6,299,711 | B1 |   | 10/2001 | Wagaman |
| 6,331,220 | B1 |   | 12/2001 | Wagaman |
| 2011/0140038 | A1 |   | 6/2011 | Presley et al. |

OTHER PUBLICATIONS

Batton, William E.; Oxygen Source for Underwater Vehicle Fuel Cells, Office of Naval Research contract No. N00014-01-M-0210 Final Report, 2002.
Campbell, A.N.; The System Lithium Chlorate—Lithium Chloride-Water at Various Temperatures, 1956.
(Continued)

*Primary Examiner* — Melvin C Mayes
*Assistant Examiner* — James Corno
(74) *Attorney, Agent, or Firm* — Lathrop & Gage LLP (57) ABSTRACT

Provided are methods and devices for storing and generating oxygen from a low temperature oxygen generating liquid. The oxygen storage method may use lithium chlorate plus water to store oxygen wherein all solids that may be present enter solution for delivery as a liquid to a reaction vessel. The oxygen production method may be a batch process with steps to heat the liquid, boil out the water, thermally decompose the lithium chlorate and then rinse out the remaining product. The apparatus for oxygen generation may use multiple reaction vessels operating sequentially to produce a continuous flow of oxygen with a rinse step in a separate area from the heat application area to remove end product solid. The device for oxygen storage includes a storage vessel and is configured to heat the oxygen generating liquid using waste heat present in the rinse liquid.

17 Claims, 5 Drawing Sheets

(56) References Cited

OTHER PUBLICATIONS

Campbell, AN.; The Systems Sodium Chlorate-Water-Dioxane and Lithium Chlorate-Water-Dioxane, at 25o, Canadian Journal of Chemistry, vol. 44, pp. 935-937, 1966.

Cordes, H. F.; Thermal Decomposition of Lithium Perchlorate. II. The Chloride Catalysis; The Journal of Physical Chemistry, vol. 78, No. 8, 1974.

Long, J. R.; Perchlorate Safety: Reconciling Inorganic and Organic Guidelines; Chemical Health and Safety Journal, 2001.

Khorunzhii, B. L.; Solid-Phase Decomposition of Potassium and Sodium Chlorates and Perchlorates in the Presence of Manganese Dioxide; Foreign Technology Division, Wright-Paterson AFB, Report No. FTD-HT-23-0211-75, 1972.

Zhang, Yunchang; Catalytic Effects of Non-Oxide Metal Compounds on the Thermal Decomposition of Sodium Chlorate, Ind. Eng. Chem. Res 1993, 32, 2863-2865.

* cited by examiner

OXYGEN STORAGE AND GENERATION USING AN OXYGEN GENERATING LIQUID

CROSS-REFERENCE TO RELATED APPLICATIONS

This application is a Continuation-in-Part application of Ser. No. 12/927,545 filed Nov. 17, 2010, now abandoned, which claims the benefit of U.S. Provisional Application No. 61/281,406 filed Nov. 17, 2009, each of which are incorporated by reference in their entirety to the extent not inconsistent herewith.

BACKGROUND OF THE INVENTION

Disclosed herein are methods and related devices for storing and generating oxygen from oxygen generating liquids.

In various applications there is a need for oxygen generation where access to atmospheric oxygen is not possible or restricted. Such applications include undersea systems where oxygen can be used for power generation when reacted with fuels in either combustion or fuel cell power generation systems. Other applications include oxygen for human consumption in aircraft emergency breathing systems or in submarines for crew oxygen. Oxygen generation by solid "oxygen candles" is a well-established technology (see, e.g., U.S. Pat. Nos. 3,615,251 and 4,981,655). Other more exotic oxygen generation systems use thermal decomposition of high temperature liquid lithium perchlorate to produce oxygen (see, e.g., U.S. Pat. No. 5,376,352). Low temperature liquid systems are attractive from the standpoint of ease of refilling and for characteristics like ease of delivery and control using conventional flow control valves and pumps known in the art. Such systems could use various oxygen generating liquids such as represented in U.S. Pat. Nos. 6,165,295, and 6,230,491, where hydrogen peroxide is the principal oxygen generating compound. Hydrogen peroxide has negative characteristics such as slow decomposition at room temperature at low concentrations, spontaneous decomposition at high concentrations, and limited oxygen storage capability. Systems using solids, such as solid "oxygen candles" and high temperature molten salt systems, suffer from disadvantages including difficulty in refilling, handling a high temperature liquid, or an inability to stop or modulate oxygen flow. These shortcomings in the art establish that a need exists for better oxygen storage and generation systems and specifically systems using low temperature liquids.

SUMMARY OF THE INVENTION

Certain chlorate and perchlorate salts thermally decompose into their chloride salt and free oxygen with trace amounts of chlorine. Those salts have high oxygen content making them effective oxygen generating compounds. An example of such a compound is Sodium Chlorate ($NaClO_3$) widely used in solid "oxygen candles". Certain of these compounds also exhibit high solubility in water. Lithium Chlorate ($LiClO_3$), which has a very high room temperature solubility in water of 421 g ($LiClO_3$)/100 g($H_2O$) is one such compound. Provided herein are methods and devices for storing and generating oxygen using a low temperature oxygen generating liquid. In an aspect, the oxygen storage method uses a high concentration solution of lithium chlorate and water which optionally has lithium chlorate solids present. This is referred to as a solution that is saturated or super-saturated, with at least a detectable level of solid lithium chlorate. In this aspect, heating and/or adding water ensures all lithium chlorate is in solution for delivery as a low temperature liquid. In an embodiment, the method combines the oxygen generating characteristics of lithium chlorate with its high solubility in water to yield beneficial properties such as high volumetric and gravimetric oxygen storage density and ease of storing and handling as a low temperature liquid.

In an aspect, the oxygen generation method comprises a batch process. In one embodiment, the batch process relates to loading an oxygen generating liquid into a reaction vessel, applying heat to boil out the water leaving behind the chlorate salt, continuing to apply heat until oxygen is released via thermal decomposition, and leaving the chloride salt in the reaction vessel. The heat may be removed to ensure the chloride salt is a solid. The solid chloride salt is removed from the reaction vessel using a rinse liquid that is water based, to prepare the vessel for a repeat of the process in the same vessel. Repeating this process allows production of oxygen on a continuous basis.

The oxygen generation method may be enhanced by the use of catalysts that can be premixed in the solution or added later in the process as desired including before or during any of the heating steps, or before, during or after any of the introducing steps. The chloride product can act in lithium chlorate decomposition processes, in a similar manner to the catalytic effect for lithium perchlorate. Accordingly, in an embodiment, any of the methods or devices herein relates to added lithium chloride to the stored oxygen generating liquid or the presence of solid residual lithium chloride from the previous decomposition in the reaction vessel to provide a catalytic benefit to the process.

In an embodiment, the oxygen generation device comprises multiple reaction vessels operated sequentially with oxygen from each vessel captured in a plenum from which oxygen can be delivered to an end use at a constant rate. The apparatus includes means for applying heat to the reaction vessels and may include a means for capturing and using waste heat from the oxygen generation process to enhance process efficiency. Means for applying and capturing heat include heaters, heat exchangers, radiators, and conduits that convey a fluid having a fluid temperature that is different than the object being heated or cooled. The apparatus includes means for isolating the product removal rinse process from the heat application and oxygen generation process, such as by a conveyer that moves a reaction vessel to a rinse configuration. The apparatus includes means for introducing a rinse solution to remove the solid chloride product and for capturing the rinse solution with the removed chloride product for subsequent disposal or use, such as by a rinse solution reservoir that is pumped or gravity fed to the reaction vessel and subsequently collected by a collector. Depending on the end use, the apparatus may include means for cooling the produced oxygen to manage its temperature and water vapor content, such as by heat exchangers and dehumidifiers.

The apparatus for storing oxygen as a low temperature liquid comprises a vessel of any shape with means to ensure the temperature of the liquid or water content of the liquid is such that during operation all the oxygen generating compound is in solution. This means may be a heating element in thermal contact with the vessel or fluids contained therein. As used herein, "heating element" is used broadly and refers to any heating means, including heaters, flowing or stagnant fluid (including from any of the processes provided herein) having thermal contact. Source of the heat may be a primary power source or waste heat from an oxygen generating process or from the end use process. A means for delivery of the liquid from the storage vessel to the reaction vessels is included, such as conduits, piping, pumps and other flow control elements known in the art. Depending on the end use, the storage apparatus may include means for capturing the rinse solution, such as by collectors, and means for transfer of heat captured in the rinse solution to the oxygen generating liquid, such as by heat exchangers. A means may be included for pressure equalization between the storage vessel, the oxygen capture plenum, and the rinse elements to minimize fluid pumping power, such as by interconnects that interconnect the vessel, plenum and rinse elements.

The methods and devices provided are advantageously configured to utilize waste heat from various steps in other steps that may benefit from a temperature increase from the waste heat. In an aspect, the waste heat is from water steam, generated oxygen, from the decomposition step where solid LiCl product is in a reaction vessel, or rinse liquid that has been removed from the reaction vessel. The waste heat may be particularly useful to heat the oxygen generating liquid in the storage tank for introduction to an oxygen generating device from a storage temperature to an introduction temperature, wherein the introduction temperature is about 10° C. to about 30° C. higher than the saturation temperature for the amount of lithium chlorate and water in the storage vessel to ensure any solid is dissolved in water. Similarly, the heat from the reaction vessel after decomposition has occurred to generate free oxygen, may be used to heat the oxygen generating liquid prior or during introduction. Any of the waste heat may be used to heat rinse liquid to facilitate removal of solid LiCl product from the reaction vessel during a rinse step. The heat from the rinse liquid may, in turn, be harnessed to heat the oxygen generating liquid or the rinse liquid that is introduced to the reaction vessel. Waste heat is harnessed as known in the art, such as by providing elements in thermal contact, including for a flowing or a stagnant fluid appropriately configured with respect to the element for which heating is desired.

Utilizing these features allows the following objectives to be attained:

It is an object of the present invention to provide improved oxygen storage and generation wherein the method for oxygen storage is as a low temperature liquid. Accordingly, in an aspect, the oxygen generating liquid that is used in the process and device to generate oxygen is introduced and/or stored at a storage temperature that is between about 0° C. to 120° C., and subsequently heated as desired to release free oxygen.

It is also an objective to provide improved oxygen storage and generation having high volumetric and gravimetric oxygen storage density. In an embodiment, this is achieved by using an aqueous solution of lithium chlorate in water. In an embodiment, the lithium chlorate has a weight percent in water greater than about 70% and less than about 96%.

It is also an objective to provide improved oxygen storage and generation for use in energy producing systems.

It is also an objective to provide improved oxygen storage and generation to provide breathable oxygen.

It is also an objective to provide improved oxygen storage and generation that has good safety characteristics.

It is also an objective to provide improved oxygen storage and generation that allows water based clean-up of spills, including spills during introduction, during operation, and after operation and during cleaning.

DETAILED DESCRIPTION OF THE INVENTION

In the context of the methods and devices disclosed herein, a low temperature liquid means a range where conventional fluid handling devices known in the art can be used, such as selected from a range that is between about 0° C. to 120° C., and subranges thereof. A particularly useful range corresponds to the storage temperature. "Storage temperature" refers to the temperature at which the oxygen generation liquid is stored when not being used to generate oxygen. This may be at or near room temperature or ambient temperature. Another useful temperature range corresponds to an introduction temperature. "Introduction temperature" refers to the temperature of the oxygen generating liquid during introduction to an oxygen generating device. In an aspect, the introduction temperature may be a temperature in the storage vessel, but may be conceptually distinguished from the storage temperature in that the oxygen generation liquid is being, or is about to be, introduced to the oxygen generating device. Accordingly, the introduction temperature is sufficiently high so that any solid that is not in solution is dissolved in solution. In contrast, the storage temperature may be sufficiently low that the oxygen generating liquid contains a solid phase material (e.g., solid lithium chlorate covered by a saturated or super-saturated lithium chlorate solution). This provides a mechanism whereby larger amounts of lithium chlorate may be readily injected into the storage vessel (e.g., by elevated temperature introduction), and subsequently stored at a lower temperature with substantial solid phase. "Reaction temperature" refers to the process temperature employed to generate free oxygen and in an aspect involves further heating the oxygen generating liquid from the introduction temperature to the reaction temperature.

The invention may be further understood by the following non-limiting examples. All references cited herein are hereby incorporated by reference to the extent not inconsistent with the disclosure herewith. Although the description herein contains many specificities, these should not be construed as limiting the scope of the invention but as merely providing illustrations of some of the presently preferred embodiments of the invention. Thus, the scope of the invention should be determined by the appended claims and their equivalents, rather than by the examples given.

Disclosed herein are methods and related devices for storing and generating oxygen from an oxygen generating liquid, including a low temperature oxygen generating liquid. The oxygen generating liquid comprises lithium chlorate plus water that decomposes into its metal chloride plus free oxygen with the application of heat. The methods and devices are compatible with an oxygen generating liquid that includes liquid solutions without solids or, alternatively, mixtures of saturated liquid solutions with solids, as desired.

Figure 1:
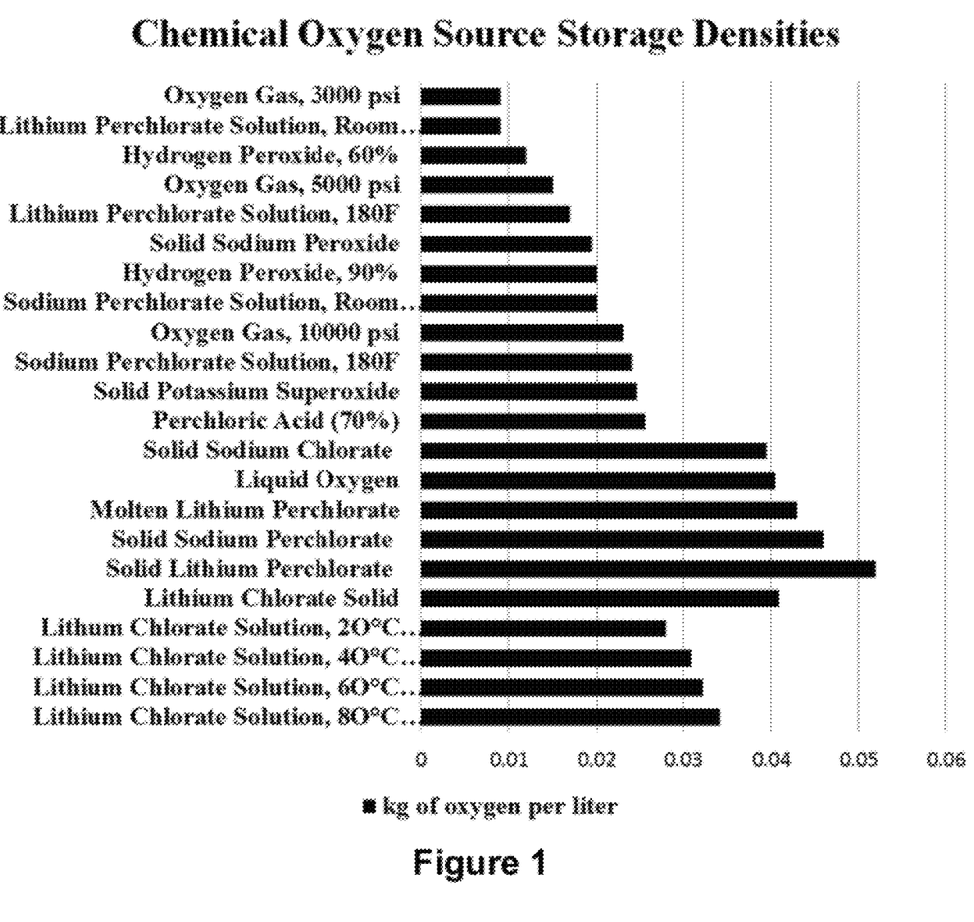
FIG. 1: Volumetric oxygen storage densities of various oxygen storage methods and the oxygen storage method of the present invention.

Data to understand the oxygen storage benefits of using an aqueous solution of lithium chlorate are provided in Table 1 and drawing FIG. 1.

If the oxygen generating liquid is delivered as a saturated solution of lithium chlorate, Table 1 shows the oxygen storage density, both gravimetric and volumetric, for the saturated solution.

FIG. 1 shows the oxygen storage method compared to other oxygen storage methods. Reference 1 describes various storage methods (Oxygen Gas (3000 psi) through Solid Lithium Perchlorate). From FIG. 1 it can be seen that lithium chlorate solution has the best oxygen storage metrics of any low temperature liquid, including at temperatures at or near room temperature. Cryogenic liquid oxygen and high temperature liquid lithium perchlorate provide better oxygen storage metrics; however, cryogenic liquid oxygen suffers from the complexities of storing and handling a cryogenic fluid along with substantial hazards and steady evaporation; and, high temperature liquid lithium perchlorate suffers from the need for high temperature handling and associated hazards and complexity.

Disclosed are methods using a low temperature liquid comprising water and lithium chlorate. At room temperature (e.g., between about 15° C. and 25° C.) or another temperature referred herein as "storage temperature", the amount of lithium chlorate may be such that it is less than, equal to, or greater than what would give a saturated solution. Generally the weight percent will be from 70% to 96% by weight, or any subrange thereof. If the amount of lithium chlorate is greater than what would yield a saturated solution at ambient temperature then a portion of the lithium chlorate will exist as solids. The oxygen storage method ensures any solids enter solution so that delivery is as a low temperature liquid by either heating to dissolve the solids, or by addition of water. Sources of the water could include recycling of water from the already delivered and processed oxygen generating liquid or from environmental sources such as the surrounding seawater in an undersea application. Sources of the heat could be waste heat from the oxygen generation process such as would be captured in the rinse liquid or from the delivered oxygen or from waste heat from the oxygen end use if used in a power producing system. Using lithium chlorate the temperature needed to dissolve all solids is low, for example at from 40° C. to 120° C., temperatures compatible with most conventional fluid control devices known in the art. Accordingly, an aspect of the invention relates to an oxygen-generating device from a an oxygen generating liquid having conventional fluid control devices that are functional up to a maximum temperature range, typically of 120° C. and below, or 100° C. and below, or sub-ranges thereof, to provide excellent oxygen generating characteristics without having to rely on more complex or temperature robust devices that would be required for systems having liquids stored and introduced at higher temperatures.

In an embodiment the method comprises the elements of 1) Use of an aqueous solution of lithium chlorate in the concentration range of 70 to 96% by weight as the oxygen generating liquid, 2) heating the oxygen generating liquid in the storage vessel to a temperature that ensures all of the lithium chlorate in the vessel enters solution; and 2), delivering 100% liquid (e.g., no solids) to the oxygen generating system by pumping or pressure feed means known in the art where the inlet location is located in a region where gravity separation of any solids and liquids ensures pickup of liquid with no solids. A "bottom region separate from the saturated solution" refers to the tendency of solids denser than the liquid they reside in to passively settle at the bottom of a container, so that one bottom region of a container will contain substantially all solids, and another region above the bottom region will be substantially solid-free. As an example, the oxygen generating liquid could be a solution with an 80° C. saturation temperature stored at room temperature, 20° C., with precipitated solids present. Since lithium chlorate forms several hydrates as noted in Reference 2 the mixture will include saturated solution plus solid hydrates with the solids and liquids separated due to their density differences. The stored liquids/solids mixture is heated, using waste heat from the thermal decomposition process or other heating means, to return the solids to solution. The temperature required to return the solids to solution is a value slightly above the saturation temperature, generally 10° C. to 30° C. above the saturation temperature, to ensure rapid entry of the solids into solution. In the noted example with an 80° C. saturation temperature this would mean a final heated temperature of 90° C. to 110 C which is modest and easily within the capability of most conventional fluid handling devices known in the art. This low temperature is in contrast to the >236° C. temperature required for the molten lithium perchlorate system of U.S. Pat. No. 5,376,352, a temperature outside the bounds of most conventional fluid handling devices known in the art.

Heating of the liquid may use waste heat from the oxygen generation process which will result in a delay during system startup while the solids are processed into solution. Therefore, an element of any of the oxygen storage methods provided herein is to locate the inlet to the liquid delivery means in a location where it will pickup saturated solution without solids. This allows a system to start on 100% liquid while heating is taking place using waste heat from the process.

An alternate embodiment of the oxygen storage method is to use additional water, e.g. using recycled water from the thermal decomposition process or other external water source, added to the storage tank to return the solids to solution. For the same 80° C. saturation temperature example a modest 129.7 g of water is required to be added to 1000 g of solution to yield a 20° C. saturation temperature. Again, to speed the process of dissolving the solids a slightly higher quantity of water may be used, generally 10% to 30% more than required to yield a saturated solution. The fluid delivery means inlet is located in the same manner to receive saturated solution substantially without solid. The two embodiments of heating and water volume increase may also be combined.

The methods and device may be incorporated in energy generating systems where the oxygen is combusted in a power cycle, or used in a fuel cell. For such applications the energy required for the oxygen generation must not exceed the energy produced from the generated oxygen.

Two thermal decompositions of lithium chlorate solution are performed to validate its oxygen generating properties and develop data necessary to assess the thermodynamics of the decomposition process. The first test uses a solution with a specific gravity of 1.27 and a weight percent of lithium chlorate of 38%. The second test uses a solution with a specific gravity of 1.81 with a weight percent of lithium chlorate of 81%. The second test includes the lithium chloride product from the first test in the solution to evaluate the self-catalysis effect. Important parameters identified in these tests include the temperatures at which significant decomposition starts and stops. This is determined by observing the volume rate of oxygen gas production. It is noted that oxygen production begins slowly but then at the noted significant decomposition temperature increases rapidly and is completed in a relatively short time of ~20 seconds.

Test #1, Start of significant decomposition: 385 C; end of decomposition: 466 C

Test #2, Start of significant decomposition: 324 C; end of decomposition: 448 C

Using the above temperatures the thermodynamics for a saturated solution is evaluated as shown in Table 2. This analysis is performed for atmospheric pressure conditions with 20° C. starting temperature. The energy to boil the water included the effect of boiling point elevation using the Clausius-Clapeyron equation. The energy calculations assume Decane as the fuel (using lower heating value), ignores the exothermic heat of decomposition, and assumes a simple system with no recuperation of the thermal energy used in oxygen production.

From this analysis it can be seen that the energy produced significantly exceeds the energy consumed. The overall efficiency of a system using the subject invention depends on the source of the heat for the oxygen production. For a combustion power cycle or a high temperature fuel cell such as a solid oxide fuel cell, the implementation can use waste heat for the thermal decomposition with minimal impact to efficiency.

Figure 2:
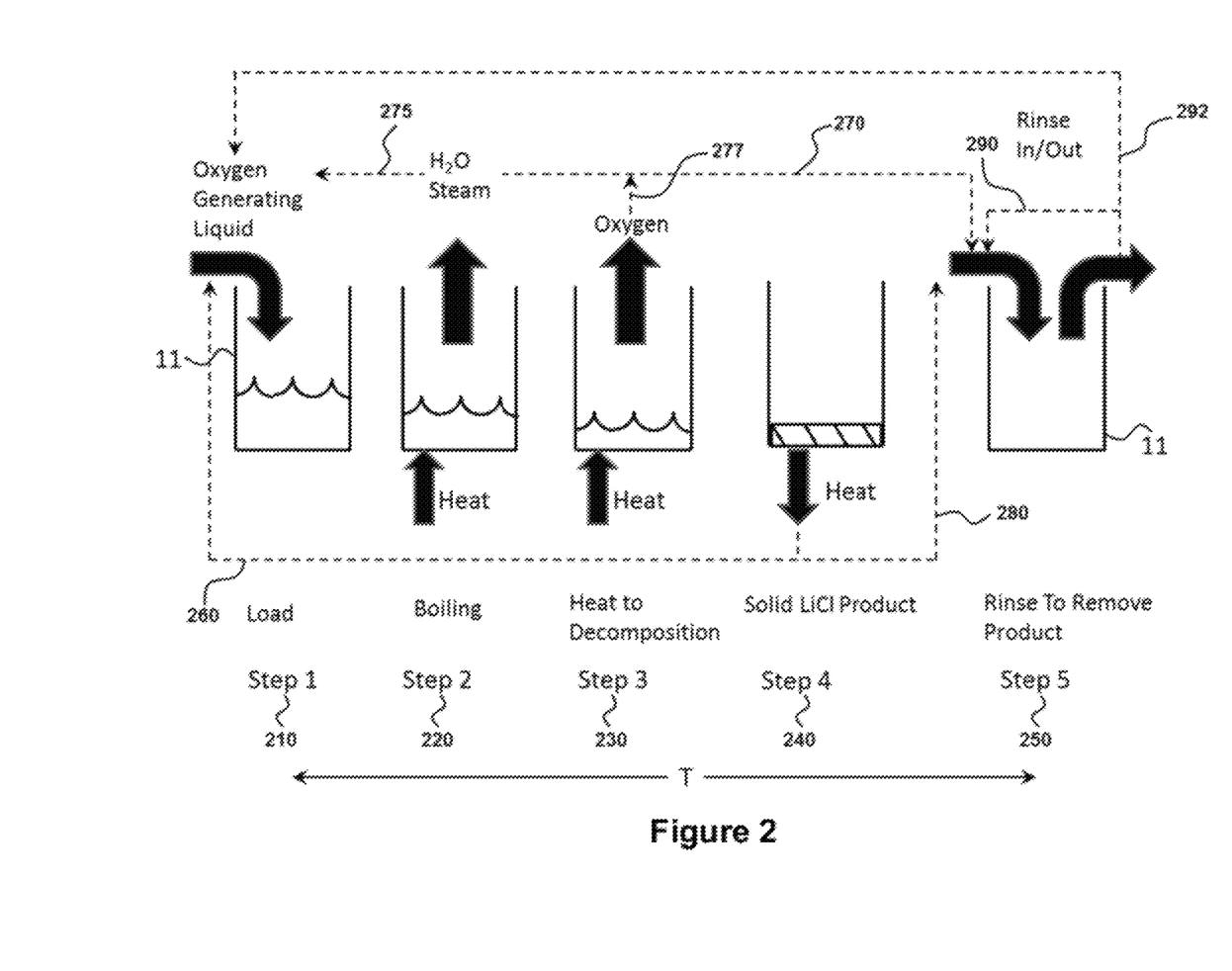
FIG. 2: An oxygen generating method.

Referring to FIG. 2 the method for producing oxygen in a continuous manner from the aqueous solution is explained. The dashed arrow lines refers to various aspects of heat transfer, wherein one part of the process may be used to heat another part. The method is a batch method comprising the following steps.

Step 1 (210): Introducing a fixed quantity of the aqueous solution of oxygen generating liquid to a reaction vessel 11.

Step 2 (220): Heating the reaction vessel to remove water from the aqueous solution by boiling, leaving the oxygen generating compound, in the preferred embodiment, lithium chlorate.

Step 3 (230): Continuing to apply heat ("further heating") to the vessel until the significant decomposition temperature of >385° C. is reached at which time the exothermic nature of the decomposition takes the temperature up and the reaction to completion.

Step 4 (240): Removing applied heat after decomposition and cooling to ensure the metal chloride product is a solid.

Step 5 (250): Rinsing by introducing and removing a rinse liquid to remove the solid product from the vessel to prepare the reaction vessel for repeating the process starting back at Step 1. Optionally, a portion of the lithium chloride product is left in the vessel to catalyze subsequent oxygen-generating reactions.

Figure 5:
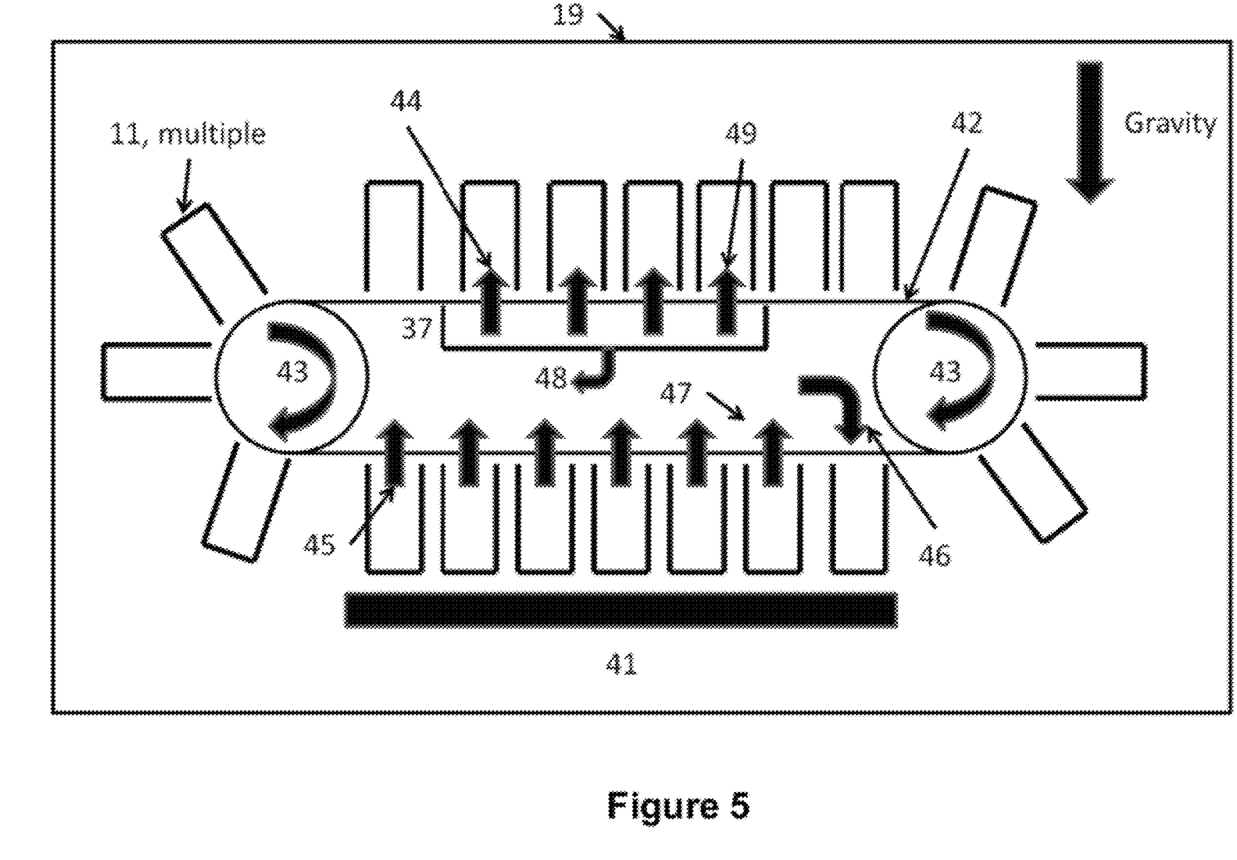
FIG. 5: Schematic illustration of a plurality of moving reaction vessels (batch generation) to separate rinse from oxygen generation.

The oxygen generating method optionally further comprises repeating steps 1 through 5 in any number of separate reaction vessels operated in sequence to produce a continuous flow of oxygen at a desired average rate (see, e.g., FIG. 5).

The oxygen generating method optionally comprises varying the fixed quantity of oxygen generated liquid per vessel load in Step 1 to control the average rate of oxygen generation.

The oxygen generating method optionally comprises varying the rate of heat application to control the average rate of oxygen generation.

As indicated by the dashed lines of FIG. 2, the process may harness waste heat (also referred to as "residual heat") generated by the oxygen generation process itself. The dashed lines, including lines labeled (260 270 275 277 290 292) represent heat flow. For example, the oxygen generating method optionally comprises using the heat present in the steam and oxygen produced to reduce the heat required via preheating the incoming oxygen generating liquid (275 277).

In another example, the waste heat relates to using the stored heat present in the lithium chloride product and reaction vessel after decomposition to reduce the heat required via preheating the incoming oxygen generating liquid (260) and to ensure the lithium chloride product is a solid for the Step 5 rinsing step by removing heat from the reaction vessel.

In another example, the waste heat is the heat present in the steam and oxygen produced and is used to improve the rinse step 5 by preheating the incoming rinse liquid (270 277).

In another example, the waste heat is the heat present in the lithium chloride product and reaction vessel after decomposition and is used to improve the rinse step 5 by preheating the incoming rinse liquid (280).

Yet another example of waste heat is the rinse liquid removed from the reaction vessel after rinsing that may be used to itself heat the incoming rinse liquid (290) or to heat the oxygen generation liquid (292).

The apparatus for oxygen production may contain any number of reaction vessels. In an aspect, the number is from 1 to about 20. These vessels may operate sequentially producing oxygen in sequential short duration bursts. In order to provide a steady flow of oxygen these bursts of oxygen from the multiple reaction vessels route to a collection plenum with the output from the plenum routed through conventional pressure regulation and flow control means known in the art, conduits, pumps, pressure and flow regulators. A heating means is provided for each vessel which may correspond to electric heaters or hot gas heaters. The hot gas may come from waste heat from the oxygen end use such as a high temperature fuel cell or a combustion engine. Solid oxide fuel cells with typical operating temperatures of ~800° C. provide adequate waste heat temperatures as do combustion engines where exhaust temperatures are generally >600° C. A means for transfer of the oxygen generating liquid from a storage vessel to each reaction vessel is provided, such as conduits, pipes, flow regulators, valves, switches and the like. A means to improve system thermal efficiency may be provided by using heat exchange means known in the art to transfer heat present in the steam and oxygen from the reaction vessels to preheat the oxygen generating liquid before it enters the vessels such as via radiators, shaped heat-transfer conduits including fins or other high surface area exchangers. If the end use requires dry and/or cool oxygen, a means may be provided to cool the oxygen/steam mixture using heat exchange means known in the art to yield cool oxygen and to remove water vapor. A means is provided for rinsing the vessels including conventional pumps and valves known in the art to route the rinse liquid into and out of the vessels. The rinse liquid may be water only or a solution of water and the chloride salt. The rinse liquid may be disposed of or may be recaptured in the same storage vessel in which the oxygen generating liquid is stored. A means is provided to preheat the rinse liquid to enhance the rinse process which, in an embodiment, comprises use of the waste heat captured in the rinse liquid from the prior rinse (see 290 of FIG. 2). A means may be provided to capture the rinse liquid in the same storage vessel as the oxygen generating liquid with means provided for transfer of heat from the rinse liquid to the oxygen generating liquid. Such capture of the rinse liquid may also be used for system weight management such as for undersea vehicles where buoyancy control is important. Means for pressure balancing the various gas and fluid systems may be provided to minimize fluid pumping power, such as via interconnects between vessels to avoid unwanted pressure buildup working against fluid flow.

Figure 3:
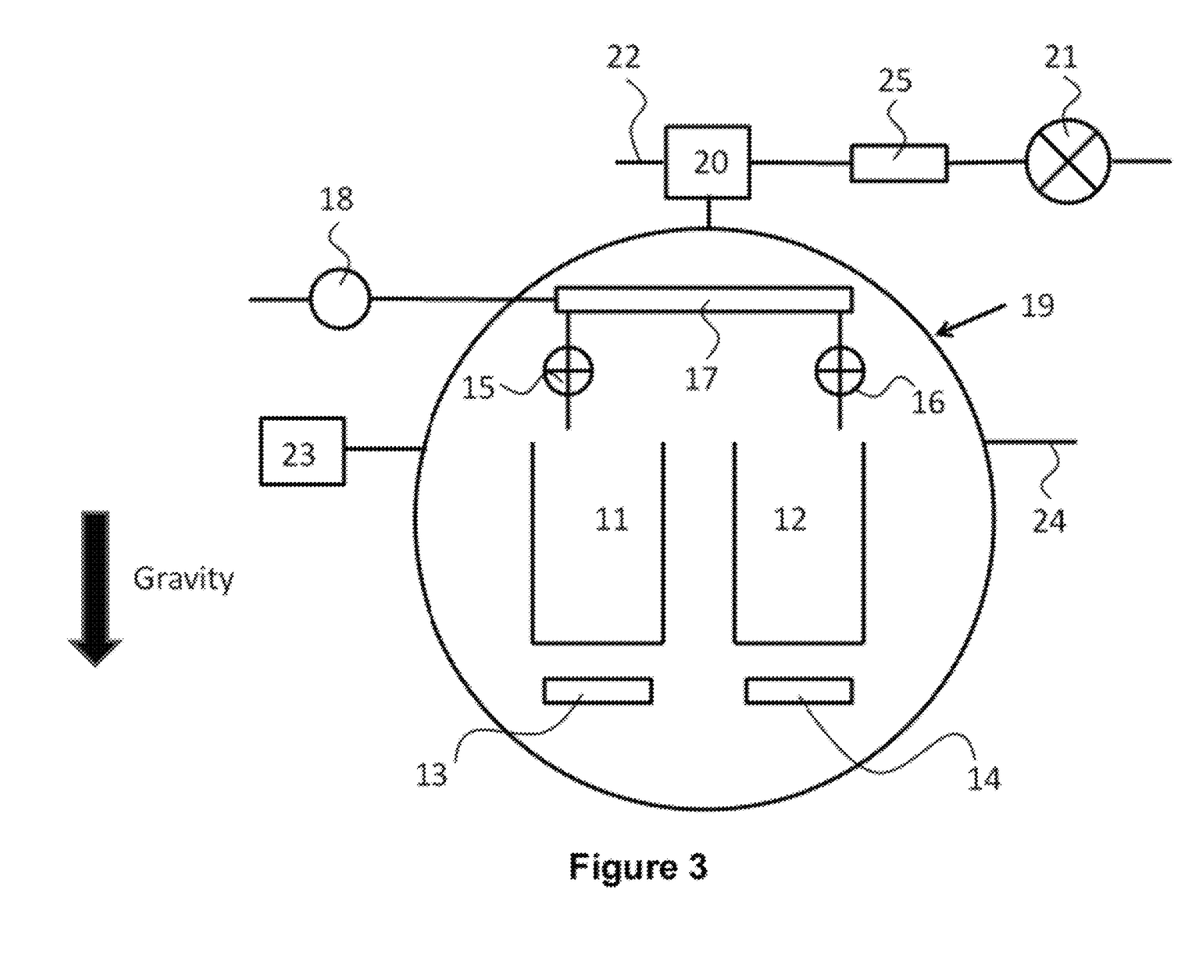
FIG. 3: Schematic illustration of fluid flow in the system, including introduction of the oxygen generating liquid, and flow of subsequently generated free oxygen produced from the introduced oxygen generating liquid.

FIG. 3 is a schematic of the first part of the oxygen generating device. The device has one or more reaction vessels of any desirable size or shape. Two reaction vessels are depicted, 11 and 12. Any number of vessels may be used with sizing of the vessels as described below. Each vessel is heated via heaters 13 and 14 where the heaters may be electric, hot gas or other component that generates heat, thereby reliably controlling the temperature of and in the reaction vessel. The heaters are controllable by means known in the art, such as electronic controllers that provide a user-selected amount of heat thereby controlling temperature of the solution within the vessel. The oxygen generating liquid is routed to each vessel via a pump, 18, through a heat exchanger, 17, and routing valves, 15 and 16 that establish to which vessel a load of oxygen generating liquid is delivered. The pump should be of a type that is able to deliver a precise quantity of fluid such as a metering pump. A pressure vessel, 19 (also referred herein as a "plenum"), contains the noted items and captures the boiled off steam and the generated oxygen. The oxygen/steam mixture in the pressure vessel is routed to the end use through a heat exchanger, 20, and pressure regulation/flow control means known in the art, 21. The oxygen/steam mixture is filtered to remove particulates using a filter, 25. Any condensed water vapor from heat exchanger 20 is routed out at 22. A pressure sensor, 23, is used to sense pressure in the pressure vessel, 19, said pressure being used to control the average oxygen generation rate. Interconnect 24 may be used to connect pressure vessel 19 to other fluid systems such as the oxygen generating liquid storage vessel or the rinse system so that all fluid systems are pressure equalized thus minimizing pumping power. Other interconnects or conduits, not labeled, are used throughout the system for appropriately routing the fluids.

Operation to produce a constant flow of oxygen is as follows for a two vessel embodiment with Steps as discussed above in the oxygen production method description. Vessel 11 starts Step 1 at time 0. It completes Step 5 at time 0+T (illustrated as T in FIG. 2) and then returns to Step 1 to repeat the process. Decomposition in vessel 11 occurs at time Y1 (Step 3) established by heating rates and reactant load. Vessel 12 starts Step 1 in the oxygen generation process at time 0+T/2 and completes the process at T/2+T. Decomposition in vessel 12 occurs at time Y2, again set by heating rate and reactant load. Y1 and Y2 may be approximately equal. The batch process continues to alternate between vessel 11 and 12 thus producing oxygen on a continuous basis.

Since oxygen/steam flow into vessel 19 is periodic in nature and flow out is set by the demands of the end use the pressure in vessel 19 will vary in a roughly sawtooth fashion. The minimum pressure occurs just prior to each decomposition with the maximum occurring just after each decomposition. Pressure regulation and flow control means know in the art, 21, are used to smooth out these pressure variations and deliver a constant oxygen flow rate to the end use such as by pressure sensor and regulator 23.

Control of the average oxygen flow rate is controllably selected by varying the quantity of reactant loaded into each vessel and/or varying the heat rate which varies the time between decompositions. The rate of change of pressure and the maximum and minimum pressures are used as the control inputs to make the changes necessary for a change in average oxygen generation rate. The free volume within vessel 19 and other connected elements in the system and the oxygen produced in each decomposition establish the maximum and minimum pressures experienced by the system. The rate of change of pressure is a function of oxygen delivery rate to the end use. Short term changes in oxygen demand are accommodated by the natural capacitance of the oxygen stored in vessel 19 and other connected elements. Accordingly, the devices and methods are compatible with any desired oxygen flow-rate, depending on end-use application. In an aspect the average flow-rate is between 0 (e.g., no reaction occurring or any reaction is stored in plenum 19) and a maximum, M.

Reaction vessel sizing is accomplished as follows. The time for any given vessel to complete a full cycle from Step 1 to Step 5 is time T (see FIG. 2). The total number of vessels is N. The required maximum average oxygen flow rate to be produced from N vessels is M. These parameters are used to define the maximum reactant load per vessel and thus the size of each vessel. At maximum design flow the time between decompositions is T/N. The cumulative oxygen flow in time T/N is M×(T/N). Since lithium chlorate is 53.1% by weight oxygen the maximum reactant load is (M×(T/N))/0.531. Minor adjustments to this load are made based on measured reaction efficiency for a given vessel design, which is expected to be >90%. The maximum weight of oxygen generating liquid per vessel can then be calculated based on the design weight fraction of lithium chlorate. For example, a 20° C. saturation temperature solution has a weight fraction of lithium chlorate of 81% so that the maximum weight of liquid is (M×(T/N)/0.531/0.81=W. The specific gravity for this example solution is 1.8 so that the maximum volume load is W/1.8 ml, assuming W is in grams. The volume of the reaction vessel includes an appropriate margin above this volume depending on the specific design and characteristics of the vessel. Time T is a function of the specific design of the reaction vessel, its heating system, and the lithium chlorate concentration which drives the quantity of water which must be evaporated.

A heat exchanger, 17, may be placed inside vessel 19 in a manner that the outgoing oxygen/steam flow passes over the heat exchange surfaces where heat from the hot oxygen/steam mixture preheats the incoming oxygen generating liquid to reduce system energy input (equivalent to 275 of FIG. 2). Heat captured in the reaction vessels and lithium chloride product is transferred to the surrounding oxygen/steam mixture ensuring the lithium chloride product is solid. This heat is also used to preheat the incoming oxygen generating liquid. Remaining heat can be used to preheat the incoming rinse liquid as described below.

A heat exchanger, 20, may be used to further cool the oxygen/steam mixture flowing from the vessel, 19, in order to remove water vapor as condensate via conduit 22, and/or to drop the temperature of the generated oxygen to a value suitable for an end use such as human consumption. The heat sink for this cooling can be the incoming rinse water or other heat sink such as atmospheric air or seawater in an undersea application.

Figure 4:
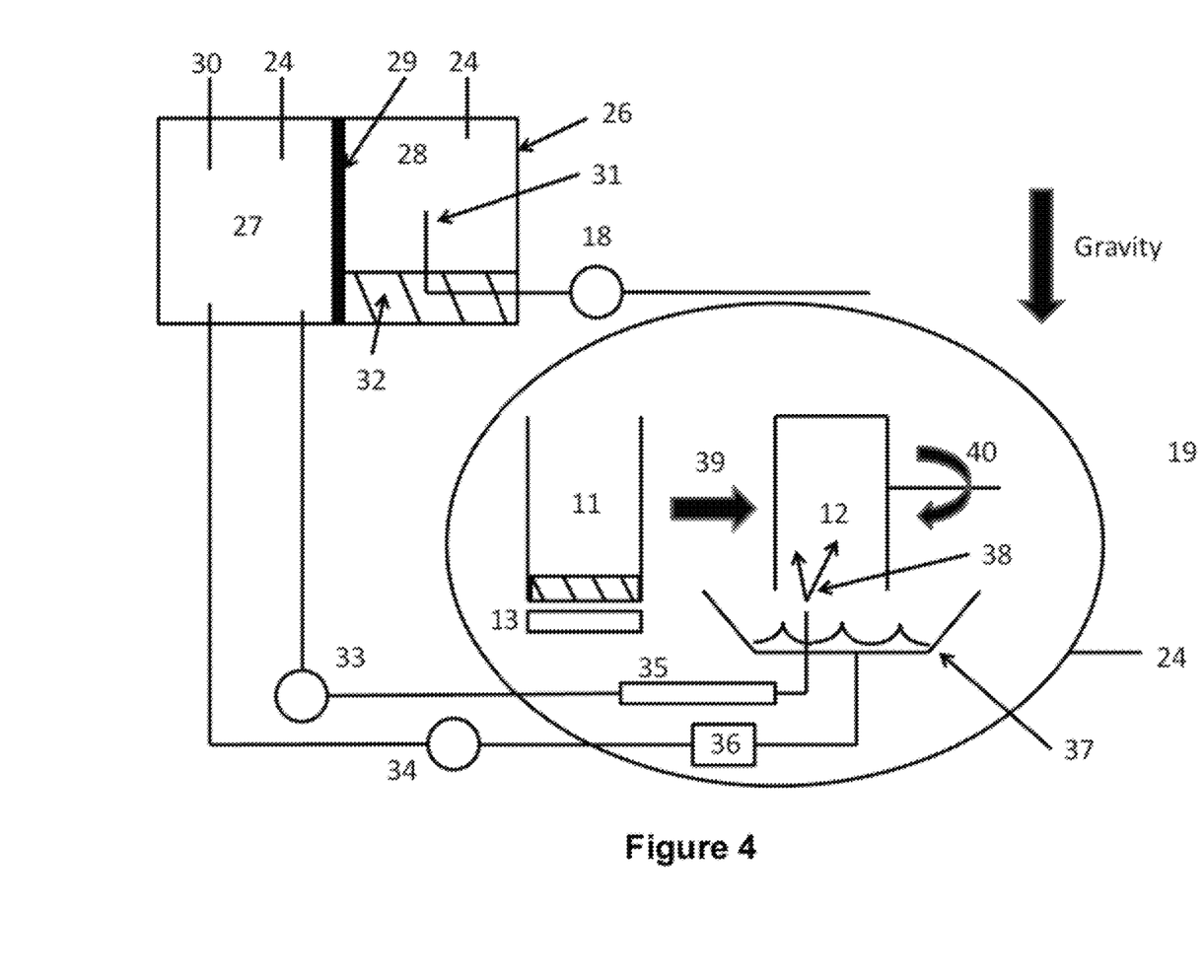
FIG. 4: Schematic illustration of a storage vessel containing an oxygen generating liquid and rinse liquid for use in oxygen storage and/or generation.

Now referring to FIG. 4 for the second part of the oxygen generating apparatus and including the apparatus for oxygen storage. In an embodiment for the device for performing a rinse step and implementing the oxygen storage method a storage vessel 26 of any appropriate size or shape contains the oxygen generating liquid in region 28 and a space for capturing the rinse liquid in region 27. A moveable separator 29 keeps the two regions isolated. The moveable separator 29 also serves as the heat transfer means to transfer heat from the hot rinse liquid to the oxygen generating liquid to ensure all solids, 32, are dissolved during the course of system operation. The moveable separator may be of the bladder type or a moveable piston as known in the art.

The oxygen generating liquid is delivered out of region 28 via pump 18 (also illustrated in FIG. 3) with inlet 31 located to be in the region of saturated solution above the solids, 32. Additional water comes into the rinse liquid region via conduit 30 and may originate from the surrounding seawater in an undersea application or from other water source for a land based application. Interconnect or conduit 24 is also shown which accomplishes pressure equalization as previously discussed. In operation, as the stored oxygen generating liquid is delivered additional water is admitted to the rinse region with the moveable separator accommodating decreasing volume in region 28 as the oxygen-generating solution is used and increasing volume in region 27 via introduction of liquid by conduit 30 and closed loop formed by introduction and removal of rinse liquid to and from reaction vessel 12.

For the reaction vessel rinse Step 250 as discussed above means is provided such as by translational control mechanism 39, to move the reaction vessel from the region of heating to a separate physical location for the rinse step. This physical movement for the rinse step has the advantage of maximizing design flexibility for the reaction vessel heaters. In the rinse area the reaction vessel is flipped upside down by means, such as directional control mechanism 40, so that rinse liquid can be sprayed in via spray nozzle 38 and pump 33, and then drain out by gravity into catch pan, 37. The rinse liquid is then returned to the rinse tank via pump 34 with inlet to that pump protected from particulates by filter 36.

FIG. 5 shows one means for accomplishing the reaction vessel movements previously discussed, 39 and 40. Multiple reaction vessels, 11, are mounted to a conveyor chain or belt, 42. Movement of the conveyor wheels or sprockets, 43, by conventional means known in the art continuously moves the reaction vessels from the region where heat is applied via heating means, 41, to a separate physical region with the vessels inverted for the rinse step. The oxygen generating liquid is added at 46, the steam from water boil off is shown at 47 and oxygen production at 45. Cooling of the lithium chloride product to solidify it occurs as the vessel moves from 45 to 44. At 44 rinse liquid is introduced and continues until 49. Catch pan 37 as discussed in FIG. 4 is shown where the rinse liquid collects to be routed out at 48. Vessel or plenum 19 is shown enclosing this portion of the device.

The oxygen generation method may be improved by using catalysts to facilitate the decomposition and improve the thermodynamics or to allow for simplified implementation or apparatus. Such an implementation might have a fixed bed catalyst such as platinum (Pt), palladium (Pd), or Manganese Dioxide ($MnO_2$) placed in the reaction vessel. Testing indicates that the decomposition reaction is self-catalyzing by the lithium chloride product in a similar manner to that discussed for lithium perchlorate. Therefore the oxygen generation method may be enhanced by dissolving lithium chloride in the solution as a catalyst. Another source for lithium chloride as catalyst is residual lithium chloride left in the reaction vessel from a prior decomposition. The test results discussed above show a 60° C. reduction in the temperature of significant decomposition with lithium chloride left from the prior decomposition. Other catalysts can include cobalt chloride ($CoCl_2$), or manganese chloride ($MnCl_2$), each of which have good solubility in water and they catalyze similar chlorates. Suspended but undissolved catalysts can be Manganese Dioxide particles. The solution and catalysts can be delivered and mixed by pumping or pressure feed methods known in the art.

In another application, for the generation of breathable oxygen, the method and device can further include a "chlorine getter" such as barium peroxide ($BaO_2$) to eliminate the trace amounts of chlorine resulting from the decomposition of the present invention. These methods are defined in the art for solid "oxygen candles" using similar compounds such as sodium chlorate.

In addition to water and lithium chlorate the oxygen generating liquid may include additives to modify certain properties of the liquid. These additives usually total less than 1 percent by weight of the liquid. For example, the liquid may include a colorant, which allows the liquid to be more easily seen to facilitate location of a spill for cleanup.

Another additive may be a thixotropic agent, which can improve the general handling properties of the liquid, such as pumping and pouring.

In addition to the defined advantages apparent in the methods of use, the aqueous solution oxygen generating liquids have good safety properties. They are not combustible alone and are not considered shock sensitive. Given the water content they are more stable and less prone to combustion when in contact with flammable materials than the solid or high temperature pure liquid form of any chlorate or perchlorate or of cryogenic liquid oxygen. The aqueous solution presents skin and eye irritation hazards, but reduced compared to other liquid oxidizers, such as fuming nitric acid. As a liquid composition inhalation risk is considered minor. Ingestion is the only significant risk. In addition, water based clean-up of spills offers another advantage. Since the liquids are fundamentally water based, spill clean-up is generally a straightforward water-based process.

As evident to those skilled in the art, various modifications can be made in light of the foregoing disclosure without departing from the spirit or scope of the disclosure. It is therefore understood that such modifications are covered within the scope of this disclosure.

REFERENCES

United States Patents

U.S. Pat. No. 3,615,251; Oxygen Producing Candle; Klenk, Frederich K.
U.S. Pat. No. 4,981,655; Chemical Oxygen Generator; Kolbe, Ernst G.; Ernst, Rainer, Fiedler, Hanz-Burkhardt;
U.S. Pat. No. 5,376,352; Oxygen storage and retrieval system; Peters, Jonathan A.; Klanchar, Martin; Hughes, Thomas G.; Mankin, James C.
U.S. Pat. No. 6,230,491; Gas-generating liquid compositions (persol 1); Wagaman, Kerry L.
U.S. Pat. No. 6,165,295; Gas-generating liquid compositions (persol 1); Wagaman, Kerry L.
U.S. Pat. No. 6,331,220; Gas-generating liquid compositions (persol 2); Wagaman, Kerry L.
U.S. Pat. No. 6,299,711; Gas-generating liquid compositions (Oxsol 3); Wagaman, Kerry L.

(37) Other References

1. Oxygen Source for Underwater Vehicle Fuel Cells, Barber-Nichols Engineering, NAVY SBIR contract N00014-01-M-0210 Final Report
2. A. N. Campbell, J. E. Griffiths: The System Lithium Chlorate-Lithium Chloride-Water at Various Temperatures
3. Yunchang Zhang, Girish Kshirsagar, John E. Ellison, James C. Cannon: Catalytic Effects of Non-Oxide Metal Compounds on the Thermal Decomposition of Sodium Chlorate
4. H. F. Cordes, S. R. Smith: Thermal Decomposition of Lithium Perclorate. II. The Chloride Catalysis
5. Solid-Phase Decomposition of Potassium and Sodium Chlorates and Perchlorates in the Presence of Manganese Dioxide, FTD, Wright-Paterson AFB AD/A-003 104
6. Perchlorate Safety: Reconciling Inorganic and Organic Guidelines; Long, John R; GFS Chemicals When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure. Specific names of compounds are intended to be exemplary, as it is known that one of ordinary skill in the art can name the same compounds differently.

Every formulation or combination of components described or exemplified herein can be used to practice the invention, unless otherwise stated.

Whenever a range is given in the specification, for example, a size, number, sensitivity, temperature, a time, rate, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

All art-known functional equivalents, of any materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

TABLE 1

Oxygen Storage Characteristics of Lithium Chlorate Saturated Solutions

| Solution Saturation Temperature (° C.) | Solubility g (LiClO3)/100 g (H2O) CRC Handbook (84$^{th}$ Edition) | Solution Specific Gravity (Reference 2) | Weight Percent Oxygen (%) | Volumetric Oxygen Storage Density (kg O2/liter) |
|---|---|---|---|---|
| 0 | 273 | 1.70 | 38.9 | 0.659 |
| 20 | 421 | 1.81 | 42.9 | 0.775 |
| 40 | 609 | 1.88 | 45.6 | 0.859 |
| 60 | 747 | 1.91 | 46.8 | 0.894 |
| 80 | 1049 | 1.95 | 48.5 | 0.946 |
| 100 | 2226 | 2.07 | 50.6 | 1.047 |

TABLE 2

Thermodynamics for the Production of Oxygen for Energy Systems

| | Solution Saturation Temperature | | | | | |
|---|---|---|---|---|---|---|
| | 0° C. | 20° C. | 40° C. | 60° C. | 80° C. | 100° C. |
| Heat to Boil Water Out of the Solution, W-hr/kg(solution) | 198 | 143 | 107 | 91 | 68 | 34 |
| Heat for Lithium Chlorate up to Significant Decomposition Temperature, W-hr/kg (solution) | 80 | 89 | 94 | 97 | 100 | 105 |
| Total Heat for Oxygen Production (No Recuperation) (W-hr/kg (solution) | 278 | 232 | 201 | 187 | 168 | 139 |
| Fuel Energy (W-hr/kg (solution) | 13709 | 1512 | 1607 | 1650 | 1709 | 1791 |
| Energy Ratio | 4.9 | 6.5 | 8.0 | 8.8 | 10.2 | 12.9 |

We claim:

1. A method for generating free oxygen from an oxygen generating liquid, said method comprising the steps of:

introducing an oxygen generating liquid into a vessel, wherein the oxygen generating liquid comprises a high concentration lithium chlorate aqueous solution;

heating the vessel to boil water out of said oxygen generating liquid and said vessel, wherein lithium chlorate remains in said vessel;

further heating said lithium chlorate in said vessel to a decomposition temperature sufficient to thermally decompose said lithium chlorate to generate free oxygen and lithium chloride product from said lithium chlorate, wherein said lithium chloride product remains in said vessel; and rinsing said lithium chloride solid from the vessel with a rinse liquid to prepare the vessel for another introduction of oxygen containing liquid.

2. The method of claim 1, wherein the further heating is to a temperature that is greater than or equal to 385° C.

3. The method of claim 1, further comprising sequentially repeating each of the steps to generate oxygen at an average flow rate over a time period.

4. The method of claim 1, wherein the method is a batch method having a periodic generation of oxygen and a periodic portion without substantial oxygen generation.

5. The method of claim 4, wherein multiple vessels are operated sequentially to produce an average flow rate of total generated oxygen equal to the number of vessels times an average flow of generated oxygen from each vessel.

6. The method of claim 5, having a user-selected maximum generated oxygen average flow (Q), and system parameters M, N, and T are selected according to the formula:

$$Q=0.531 \times M \times (N/T);$$

wherein:
M is the mass of lithium chlorate contained in the oxygen generating liquid introduced to the vessel;
N is the number of reaction vessels in sequential operation; and
T is time for a vessel to complete a full cycle;
each of M, N and T are independently selectable to obtain said user-selected maximum generated oxygen.

7. The method of claim 4, wherein said periodically generated oxygen is stored in a plenum from which oxygen can be provided, and said generated oxygen is provided on-demand from said plenum at a user-selected oxygen flow-rate for use in a downstream application.

8. The method of claim 1, wherein the rinsing step comprises:
introducing a rinse liquid that is water-based to said vessel; and
removing said rinse liquid from said vessel, wherein substantially all of said lithium chloride solid product and rinse liquid is removed from said vessel, and said water-based rinse liquid optionally comprises lithium chloride product.

9. The method of claim 8, wherein a portion of lithium chloride solid product remains in the vessel after rinsing and is a catalyst for subsequently introduced lithium chlorate solution for generating free oxygen, and said catalyst decreases said decomposition temperature by up to 60° C. compared to decomposition temperature without catalyst.

10. The method of claim 1, wherein residual heat from the thermal decomposition of lithium chlorate is used to preheat the oxygen generating liquid, the rinse liquid, or both the oxygen generating liquid and the rinse liquid.

11. The method of claim 10, wherein said residual heat is from one or more of the:
oxygen and steam released during the heating;
reaction vessel and the solid lithium chloride product generated from the heating and decomposition steps; or
rinse liquid collected after said rinsing step.

12. The method of claim 11, wherein said rinse liquid collected after said rinsing step is returned to a container in thermal contact with a storage vessel that holds said oxygen-generating liquid to be introduced to said vessel, wherein said storage vessel and said vessel that holds said oxygen-containing liquid are separated from each other by a movable separator capable of heat transfer.

13. The method of claim 1, further comprising the step of cooling the lithium chloride product in said vessel so that said lithium chloride product remains in the vessel in solid form, wherein the cooling step comprises cooling said vessel and lithium chloride left in the vessel after decomposition to a cooling temperature that is less than or equal to the melting point of lithium chloride, or less than or equal to 610° C.

14. The method of claim 1, wherein an average rate of oxygen generation from said vessel is controlled by:
varying the amount of oxygen generating liquid introduced to the vessel;
varying the rate of heat application; or
both.

15. The method of claim 1, wherein the generated free oxygen is used in an application selected from the group consisting of:
power producing combustion system;
fuel cell; and
human consumption.

16. The method of claim 1, further comprising the step of cooling said generated free oxygen thereby reducing said free oxygen temperature and humidity.

17. The method of claim 1, further comprising the step of controlling a flow of generated free oxygen by monitoring a pressure in a plenum that stores said generated free oxygen.

* * * * *